United States Patent
Alsup et al.

(10) Patent No.: US 6,668,275 B1
(45) Date of Patent: Dec. 23, 2003

(54) SYSTEM AND METHOD FOR MULTIPROCESSOR MANAGEMENT

(75) Inventors: David Andrew Alsup, Albuquerque, NM (US); Steven D. Martinez, Corrales, NM (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 09/467,128

(22) Filed: Dec. 17, 1999

(51) Int. Cl.[7] .................. G06F 15/16; G06F 15/173; H04L 1/22
(52) U.S. Cl. .................. 709/208; 709/223; 714/46
(58) Field of Search .................. 709/223, 200, 709/224, 203, 208; 714/4, 45, 41, 46, 47

(56) References Cited

U.S. PATENT DOCUMENTS

| | | | | |
|---|---|---|---|---|
| 3,629,831 A | * | 12/1971 | Mikus et al. | 340/825.53 |
| 5,319,775 A | | 6/1994 | Loges et al. | |
| 5,812,780 A | * | 9/1998 | Chen et al. | 709/224 |
| 5,881,219 A | * | 3/1999 | Leung et al. | 714/31 |
| 5,961,594 A | * | 10/1999 | Bouvier et al. | 709/223 |
| 5,983,001 A | * | 11/1999 | Boughner et al. | 714/38 |
| RE36,444 E | * | 12/1999 | Sanchez-Frank et al. | 345/349 |
| 6,003,083 A | * | 12/1999 | Davies et al. | 709/226 |
| 6,014,673 A | * | 1/2000 | Davis et al. | 707/202 |
| 6,061,725 A | * | 5/2000 | Schwaller et al. | 709/224 |
| 6,085,243 A | * | 7/2000 | Fletcher et al. | 709/224 |
| 6,101,539 A | * | 8/2000 | Kennelly et al. | 709/223 |
| 6,112,015 A | * | 8/2000 | Planas et al. | 709/223 |
| 6,199,099 B1 | * | 3/2001 | Gershman et al. | 709/203 |
| 6,237,039 B1 | * | 5/2001 | Perlman | 709/237 |
| 6,243,832 B1 | * | 6/2001 | Eckes et al. | 714/33 |
| 6,317,786 B1 | * | 11/2001 | Yamane et al. | 709/224 |
| 6,377,993 B1 | * | 4/2002 | Brandt et al. | 709/427 |
| 6,381,641 B1 | * | 4/2002 | Iwasaki | 709/224 |
| 6,434,513 B1 | * | 8/2002 | Sherman et al. | 702/186 |
| 6,502,131 B1 | * | 12/2002 | Vaid et al. | 709/224 |
| 2001/0056483 A1 | * | 12/2001 | Davis et al. | 709/224 |

FOREIGN PATENT DOCUMENTS

| | | | | |
|---|---|---|---|---|
| GB | 2313457 | * | 11/1997 | G06F/11/22 |
| GB | 2313457 A | | 11/1997 | G06F/11/22 |
| WO | WO 94/06078 | | 3/1994 | C06F/11/00 |
| WO | WO 0013456 | * | 3/2000 | H04Q/11/00 |

OTHER PUBLICATIONS

User interface development and software environments: The Chiron–1 system, Keller et al, 1991, IEEE, Pp. 208–218.*

* cited by examiner

*Primary Examiner*—Krisna Lim

(57) ABSTRACT

Disclosed is system and method for managing a multiprocessor system including at least one master processor in communication with at least one remote processor. A core interacts with one or more distributed processors through communication channels. The core provides test, synchronization, logging, and management operations to distributed processors. An agent engine, associated with the core, provides operation-related data and software from a combination of user interfaces, test scripts, and databases to the core during its interaction with the distributed processors. Target agents associated with the distributed processors receive commands from the core. Target agents can access library modules for extended command sets for target processor management, testing, and control. Target agent capability can be extended via on-line or real-time task distribution.

18 Claims, 5 Drawing Sheets

SYSTEM AND METHOD FOR MULTIPROCESSOR MANAGEMENT

CROSS-REFERENCE TO RELATED APPLICATIONS

Not applicable.

GOVERNMENT RIGHTS

The invention was made with United States Government support under Contract No. DAAE30-95-C-0009 awarded by the U.S. Army. The Government has certain rights to this invention.

BACKGROUND OF THE INVENTION

The present invention is related generally to the field of microprocessors. More particularly, the present invention is related to the management of multiprocessors and/or distributed multiprocessor systems.

Multiple interconnected and/or interdependent processor systems generally range from a multiprocessor system with relatively low bandwidth interconnects to systems where higher bandwidth interconnects are desired. In both environments, and in particular where multiprocessor systems provide low bandwidth interconnects with distributed software across the multiple processors, there is a need for systems and/or methods for integrating, testing and debugging and/or management of distributed, interdependent systems.

An example of a multiprocessor system having interdependencies is the U.S. Army's Crusader Advanced Field Artillery System (AFAS), which is a self-propelled military Howitzer. The Crusader electronics system includes a dozen separate modules, each having two or three processor cards that are interconnected and mostly dependent on each other. The software that runs each module is dependent on software in most of the other modules. Integration (e.g., timing synchronization), maintenance (testing and debugging) and operational management (e.g., communication and/or synchronized program execution) in multiprocessor environments is difficult in light of the these interdependencies. All of the modules in a multiprocessor systems typically have to be synchronized to operate and communicate properly. An operator or technician may need to be able to test parts of the entire interdependent system without other interdependent modules being affected (e.g., ceasing operation).

The current multiprocessor solution for management, and to ensure proper synchronization and operation, is to essentially break a system into separate modules/components and test each module separately. With current systems and methods, modules are each tested one at a time while everything else in the system is simulated. Current systems and methods generally handle one processor and/or associated modules at a time.

What is needed are apparatuses and methods that enable reliable integration, synchronization, maintenance and management of complex multiprocessor systems without interruption of the entire system's operation.

BRIEF SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

The present invention provides a system for managing the operation and maintenance of complex multiprocessor systems. In accordance with one aspect of the present invention, a system is disclosed for managing a multiprocessor system includes a core processor in communication with at least one remote processor or process or thread or tasks running on at least one machine. A core processor interacts with the distributed processes through internal or external communication channels such as messaging queues, packets, block transfers or shared memory schemes. The core provides test, synchronization, logging, and management operations to the distributed processors. An agent engine such as a script interpreter, associated with the core, provides operation-related data and software from a combination of user interfaces and databases to the core during its interaction with the distributed processors. Target agents associated with the distributed processors receive commands from the core. Target agents can access a library module for an extended command set for processor management.

In accordance with another aspect of the present invention, parts of a complex system can be simulated in hardware and/or software, integrated or standalone, in order to maintain integration and synchronization, while the simulated part is being serviced (e.g, tested, maintained and/or debugged).

In yet another aspect of the present invention, staged testing of distributed processors belonging to the multiprocessor system allows different pieces of a multiprocessor system to be phased out while the multiprocessor system simulates the missing component. Furthermore, necessary modules of the entire system can be simulated to the module undergoing testing. Testing of modules can proceed one at a time or in plurality because all or part of the entire system can be simulated in the test environment.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The invention provides a time synchronized, flexible, programmable, system for managing a plurality of processors, for integrating a plurality processors, and provides for their testing, together or individually (to provide the test and simulation for multiple processors). The present invention is useful in any environment where plural, interdependent processors are used. Examples of such systems can be found in military, telecommunication, networking, space and aviation, medical and manufacturing system technologies. The invention is also useful in systems that take advantage of distributed software.

Figure 1:
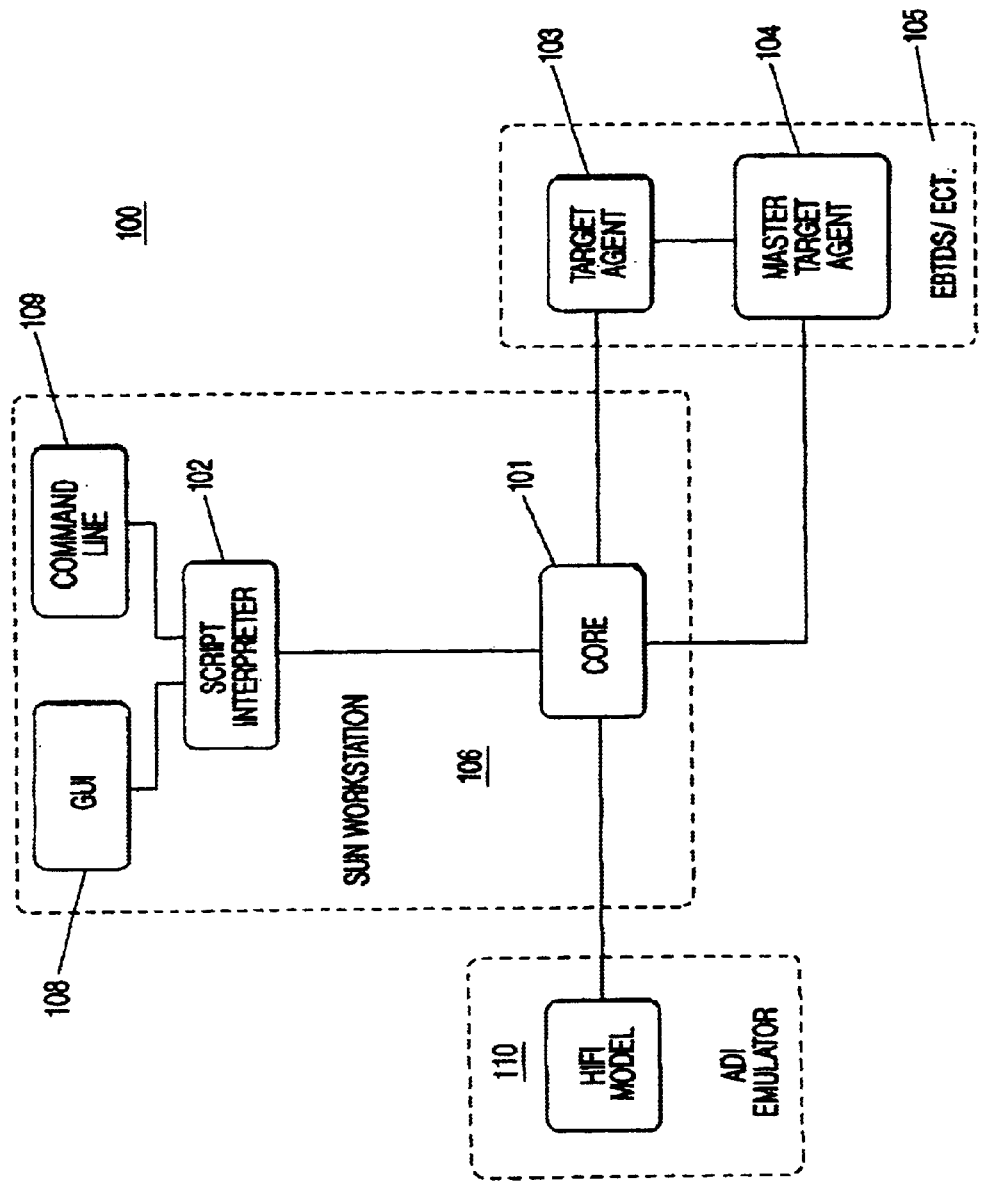
FIG. 1 is a block diagram of components of the invention that can interact during management of a multiprocessor system.

Referring to FIG. 1, a schematic layout of modules operational within a system 100 for the present invention is illustrated. Components that are important to management of a multiprocessor system are the core 101, script interpreter 102, and target agents 103. In a distributed multiprocessor system, there would be a plurality of target agents 103 assigned to each processor 105 in the system. An associated plurality of master target agents 104 can accompany the target agents at each processor 105 of the multiprocessor system as will be apparent to those skilled in the art. Master target agents 104 can operate in support of the target agents 103, but are not essential as will be described in more detail below. A workstation 105 can house the core 101 and script interpreter 102, which provide for centralized control of the distributed multiprocessor system 100. For example, a Sun Workstation (TM) would provide the functionality required by the controlling portion of the system. The workstation is where command files and the test scripts deployed within the multiprocessor system are interpreted and transmitted. The workstation 106 is where the basic time base is maintained for synchronization across multiple targets (processors 105). The target agents 103, alone or in cooperation with associated master target agents 104, execute at each of the processors 105 in the system.

A user would interface with the workstation through a GUI (Graphical User Interface) 108 and/or commands from any input device 108 (e.g., keyboard). Commands are entered at the input device 108, and are interpreted and executed at the core 101. The core 101 connects active components running on the system and a simulation stimulus so values can be read from the system. The values can be applied to an external stimuli. Signaling is used to test remote processors through associated target agents 103.

A simulation module 110 (e.g., system and/or software) provides closed-loop testing capabilities to the system. The simulation module 110 can provide the multiprocessor system 100 with hardware simulation. The simulation module 110 can include hardware that provides various signals to hardware undergoing testing. The simulation module 110 is simulates signals as needed, for example, in closed-loop testing. Signals can be provided directly from the simulation module 110 to the target agents 103. The core 101 controls the simulation modules 110 interaction with target agents 103. The core 101 can also draw from software assets to generate simulations required in the system 100.

Figure 2:
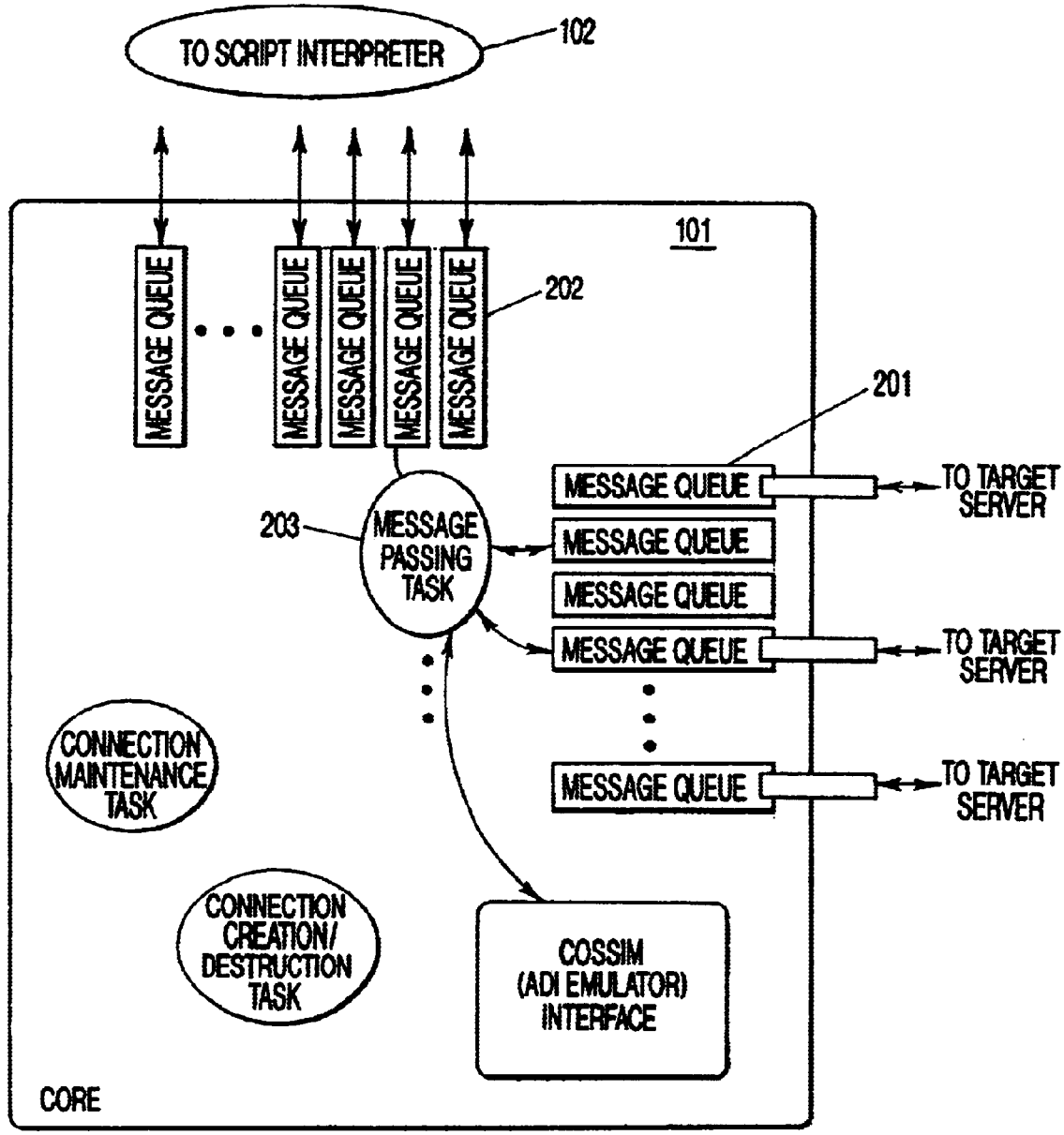
FIG. 2 is a block diagram of a core module of the present invention having message routing capabilities through internal or external communications.

Referring to FIG. 2, the core 101 for the invention is illustrated in more detail. The core 101 can interact with other system components through message queues 201. Plural queues 201 add separate message pipes to targets stationed with remote processors of the multiprocessor system. A separate communications channel can be provided to each of the processors in the system. A message passing task module 203 takes care of synchronizing and prioritizing all message traffic deployed across the system to the various targets.

A second set of queues 202 can communicate with the script interpreter 102. The plurality of queues 201/202 enable simultaneous processes to be managed. Multi-threaded testing is thereby be possible with the present system. The multiple queues 201/202 enable simultaneous management and execution of plural activities within the multiprocessor system. Activities can, for example, include software scripts or commands from various portions of the GUI and/or user interfaces. Plural inputs are taken from a test environment by the core 101 and a correlation between queues is made. The core 101 can identify what target server (target agent) a message or command must be sent to and manages plural message order and priority.

Figure 3:
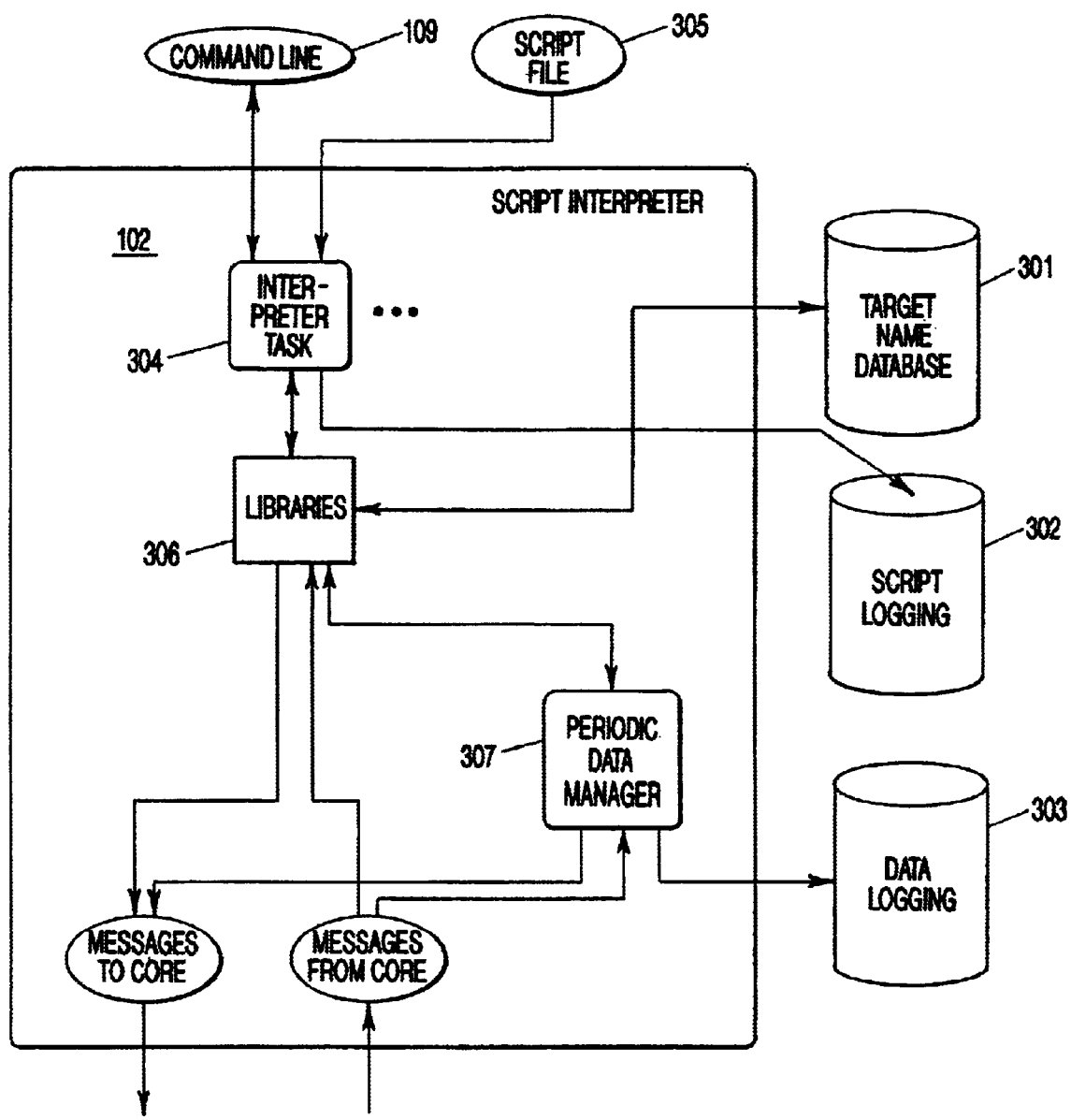
FIG. 3 is a block diagram of a script interpreter module of the present invention.

Referring to FIG. 3, a script interpreter 102 draws from plural databases 301–303 for software and/or data during multiprocessor system management (e.g., operation and testing). A task interpreter 304 receives commands from the user interface 109 and can read software from script files 305. The interpreter 304 interprets scripting language. The interpreter 304 in some embodiments has access to libraries. A set of standard libraries 306 can be included as part of the system to enables interfacing with plural targets, and allows for operational management locally with the workstation and remotely at targets. All data can reside in the databases 301–303 or elsewhere as will be apparent to those skilled in the art. The target name database 301 can be where all entities that comprise the plural targets are identified. The script logging database 302 logs all occurrence during the testing and/or operation. For example, time logging of events that occur during testing simplifies the identification of relative data or scripts needed to evaluate test results.

A periodic data manager 307 collects data from any and/or all targets. The periodic data manager 307 can be time correlated to any frequency necessary to synchronize with and obtain data from targets. Data is made available to the GUI and/or logged into a data logging database 303. A data logging database 303 differs from the script logging database 302 in that data in the script logging database 302 can be used to keep track of command operations provided throughout the system for execution. The data in the data logging database 303 can be information that is obtained as a result of commands operations. The time base between logs for the two databases is synchronized so that commands can be matched with data or results.

Figure 4:
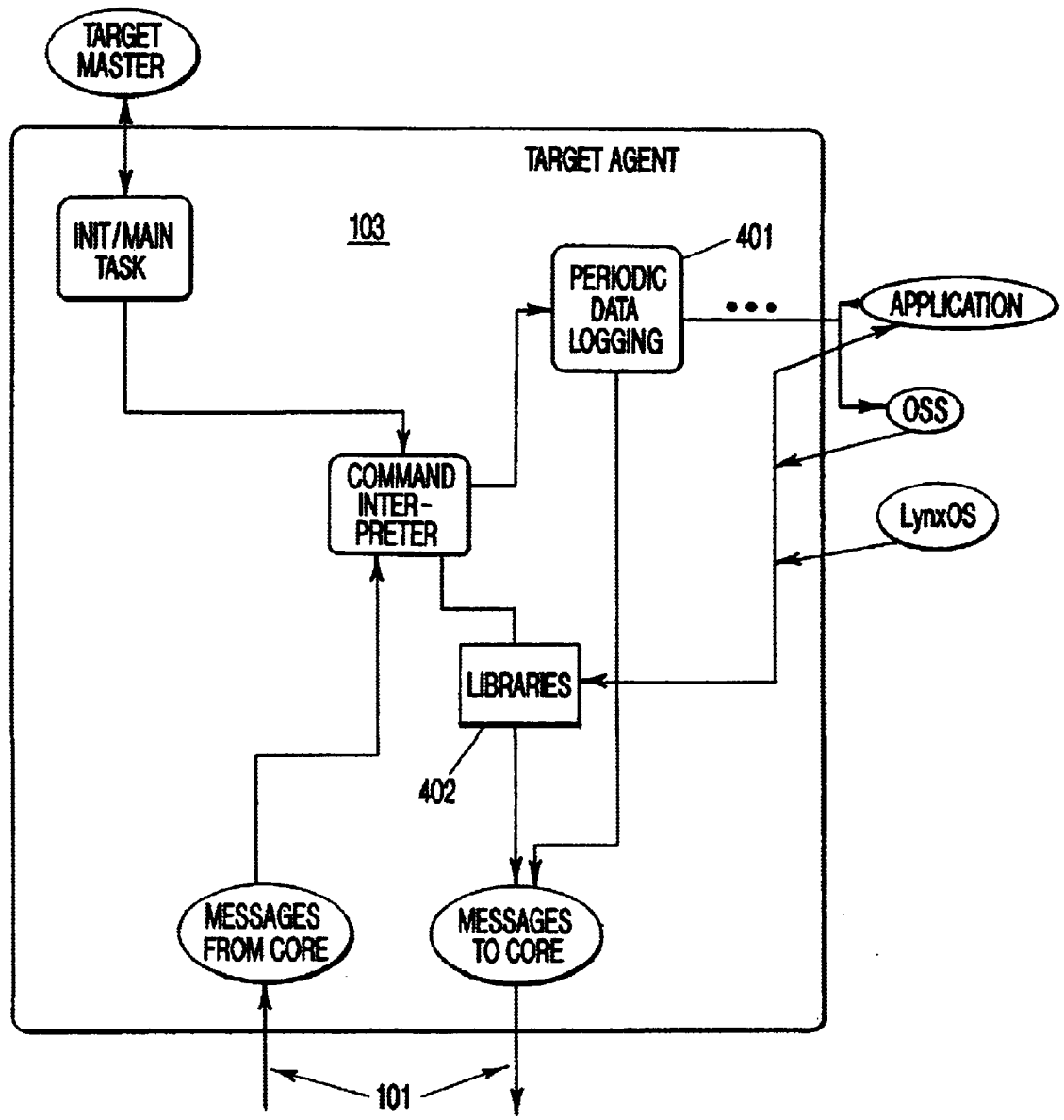
FIG. 4 is a block diagram of a master target agent that can be used with the invention in the management of multiprocessor system.

Referring to FIG. 4, a diagram of a target agent 103 is shown. The target agent 103 can include a periodic data logging module 401 that logs data at variable frequencies. The target agent 103 receives commands from the core 101, which can be forwarded by the core 101 from the script interpreter 102 (as described before). The target agent 103 receives scripting commands, interprets them and executes, or assists the processors in executing, the commands if required. Commands can include, for example, halt the processor to regain synchronization, obtain a specific subroutine in the application, read data from an I/O, etc. The periodic data logging module 401 can generate data stored in the data logging database 303 (FIG. 3). Module 401 transmits data with the appropriate time stamp information.

A Library module 402 can provide an extended command set to the target agent. A command set, for example, enables I/O cards/interfaces and/or communication to the OSS. The libraries module 402 provides resident resources associated with the target agent 103 for standard commands to be managed and turned into the specific OSS-type commands for the targeted processor.

Figure 5:
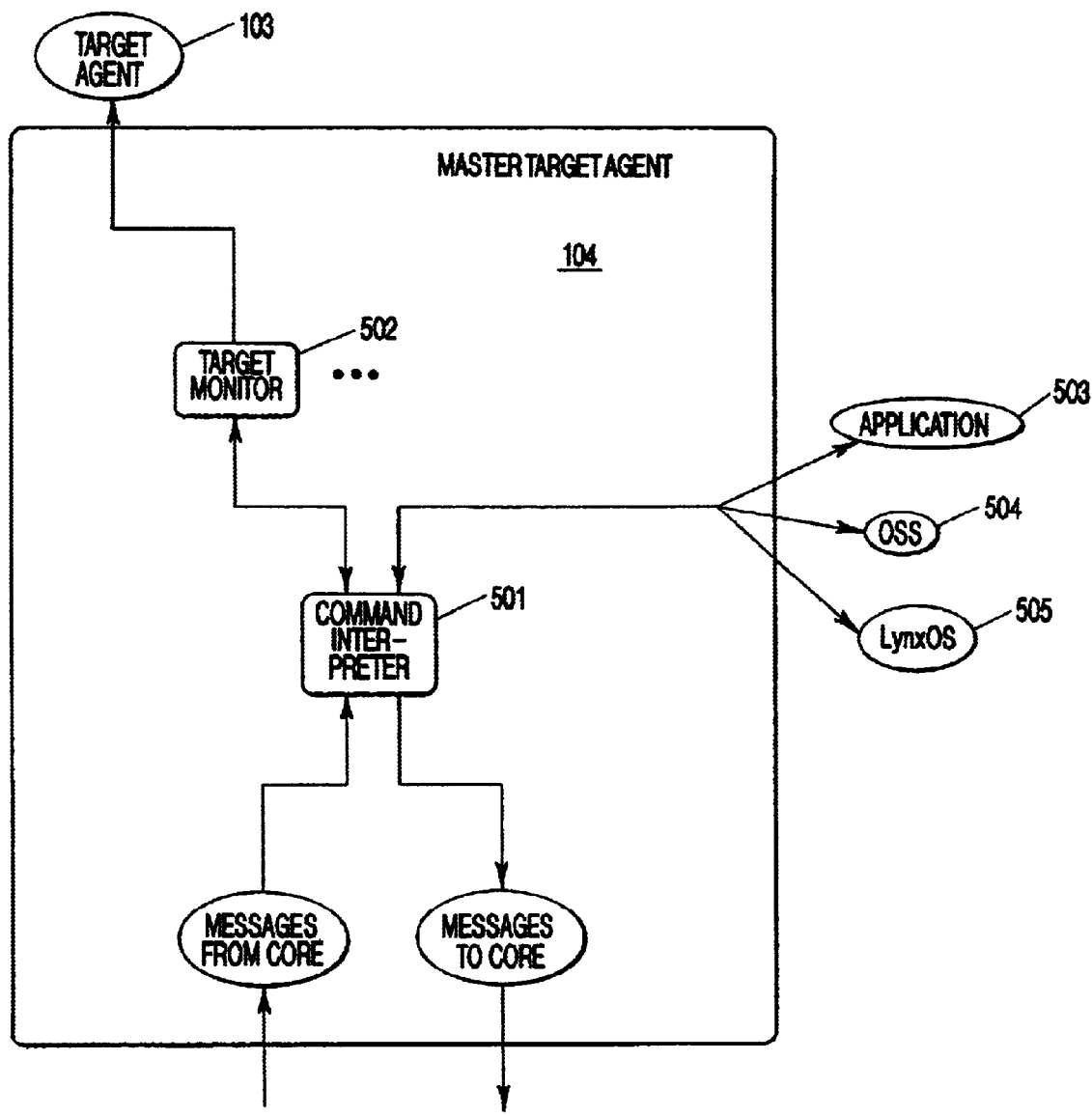
FIG. 5 is a block diagram of a target agent module of the present invention.

A master target agent 104, shown in FIG. 5, can be assigned to target agents 103. The master target agent 104 can include a command interpreter 501 for receiving/transmitting messages from the core 101 and/or workstation 106. The master target agent 104 is deployable at the remote processor as needed to receive and manages operational messages and/or data for the target agent 103 the master target agent 104 is assigned to. The master target agent 104 is able to organize multiple tasks for the target agent 103 and monitors the target agent through a target monitor 502. The master target agent 104 is able to interface with applications 403, operating system services (OSS) 504 and/or proprietary system services 505. The OSS is generally known as a middleware layer that manages the communications with an operating system. Messages from core will generally include commands and/or data. Many messages may not have to go through a master target agent 104 as will be apparent to those skilled in the art. The primary purpose of the master target agent 104 is to interface with the target agent 103, monitor its operation, and manage information from the core to the target agent 103 as it supports the remote processor to which it is assigned.

The minimum modules required to implement multiprocessor management are the core 101, script interpreter 102 and at least two target agents 103 deployed with at least two processors of a multiprocessor system. Generally speaking, the script interpreter 102 issues a set of commands for the core 101 to initialize communication with a set of target agents 103 assigned to various processors. The script interpreter 102 can then send the series of test commands to system component. Commands include data transmission, program and/or subroutine execution, and synchronization break or set points. The core 101 synchronizes all of the target agents 103 so that they are all working with the same time sequence/reference. The target agents 103 facilitate the integration of associated remote processors with the system and execute commands dictated by the script interpreter exactly.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto.

The embodiments of an invention in which an exclusive property or right is claimed are defined as follows:

1. A system for autonomously managing multiprocessors comprising at least one master in communication with at least one remote processor, said master further comprising:

a core, said core incorporated in said at least one master, interacting with distributed real-time agents through communication channels, said core providing test, synchronization and management operations to said distributed agents; and a script interpreter, associated with the core, said script interpreter for providing real-time operation-related data and software from a combination of user interfaces, command files, test scripts and/or databases to said core during the cores interaction with said agents.

2. The system of claim 1, wherein said core provides closed-loop testing of said system, including distributed processors, through a simulation module.

3. The system of claim 2, wherein said core provides operational simulations for testing of said system, including said distributed processors.

4. The system of claim 1, further comprising a message passing task module manages traffic in communication with said core.

5. The system of claim 4, wherein said message passing task module prioritizes said traffic in communication between said core and said distributed processors.

6. The system of claim 1, further comprising a script interpreter in communication with database multiprocessor management resources.

7. The system of claim 1, further comprising a script logging database for keeping track of command operations occurring between said core and distributed processors.

8. The system of claim 2, wherein said distributed processors further comprise an associated target agent for receiving commands from said core.

9. The system of claim 8, wherein said target agent further comprises a library module for providing an extended command set to the target agent for distributed processor management.

10. The system of claim 9, further comprising a periodic logging module for logging communication with the distributed processor associated with the logging module.

11. A system for autonomously managing multiprocessors, comprising:

a core interacting with distributed processors through communication channels, said core providing test, synchronization and management operations to said distributed processors;

a script interpreter, associated with the core, said script interpreter for providing real-time operation-related data and software from a combination of user interfaces and databases to said core during the core's interaction with said distributed processors;

a message passing task module for managing real-time traffic in communication with said core through at least one queue;

a script interpreter in communication with database multiprocessor management resources, for facilitating test, synchronization and management of distributed processor with said core from databases; and a script logging database for keeping track of command operations occurring between said core and distributed processors.

12. The system of claim 11, wherein said core provides closed-loop testing of said system, including distributed processors, through a simulation module.

13. The system of claim 11, wherein said core provides operational simulations for testing of said system, including said distributed processors.

14. The system of claim 11, wherein a message passing task module manages traffic in communication with said core.

15. The system of claim 14, wherein said message passing task module prioritizes the traffic in communication between said core and said distributed processors.

16. The system of claim 11, further comprising a script interpreter in communication with database multiprocessor management resources.

17. The system of claim 11, further comprising a script logging database for keeping track of command operations occurring between said core and distributed processors.

18. A method for autonomously managing multiprocessors, comprising the steps of:

providing a core interacting with at least two real-time distributed processors through real-time messaging queues, said core providing test, synchronization and management operations to said distributed processors;

providing a script interpreter, associated with the core, said script interpreter for providing real-time operation-related data and software from a combination of user interfaces and databases to said core during the cores interaction with said distributed processors; and providing real-time target agents associated with said distributed processors for receiving commands from said core, said target agents further comprising a library module for providing an extended command set to the target agent for distributed processor management.

* * * * *